(12) United States Patent
Naylor (10) Patent No.: US 9,290,890 B2
(45) Date of Patent: *Mar. 22, 2016

(54) HEATING UNIT FOR DIRECT CURRENT APPLICATIONS

(75) Inventor: David Naylor, Draper, UT (US)

(73) Assignee: 417 and 7/8, LLC, Park City, UT (US)

( * ) Notice: Subject to any disclaimer, the term of this patent is extended or adjusted under 35 U.S.C. 154(b) by 664 days.

This patent is subject to a terminal disclaimer.

(21) Appl. No.: 13/607,437

(22) Filed: Sep. 7, 2012

(65) Prior Publication Data

US 2013/0001217 A1    Jan. 3, 2013

Related U.S. Application Data

(63) Continuation of application No. 12/258,249, filed on Oct. 24, 2008, now abandoned, which is a continuation-in-part of application No. 11/835,641, filed on Aug. 8, 2007, now abandoned, which is a (Continued)

(51) Int. Cl.
*H05B 3/34* (2006.01)
*E01C 11/26* (2006.01)
(Continued)

(52) U.S. Cl.
CPC ............... *E01C 11/265* (2013.01); *E01C 23/03* (2013.01); *H05B 1/0275* (2013.01); *H05B 3/36* (2013.01);
(Continued)

(58) Field of Classification Search
CPC ..... E01C 11/265; E01C 23/03; F24D 13/022; H05B 1/0275; H05B 2203/003; H05B 2203/014; H05B 2203/017; H05B 2203/021; H05B 2203/029; H05B 3/36; H05B 3/342

USPC ................................. 219/200–213, 527–529
See application file for complete search history.

(56) References Cited

U.S. PATENT DOCUMENTS

| 1,455,287 A | 5/1923 | Hadley |
| 1,455,297 A | 5/1923 | Lyons et al. |

(Continued)

FOREIGN PATENT DOCUMENTS

| CA | 2210086 | 7/1996 |
| CA | 2598030 | 8/2006 |

(Continued)

OTHER PUBLICATIONS

U.S. Appl. No. 14/107,697, filed Dec. 16, 2013, Naylor.

(Continued)

*Primary Examiner* — Dana Ross
*Assistant Examiner* — James Sims, III
(74) *Attorney, Agent, or Firm* — Workman Nydegger (57) ABSTRACT

A direct current powered electrical heating unit capable of distributing heat across the heating unit in a substantially uniform fashion. The heating unit includes a first pliable outer layer and a second pliable outer layer. The heating unit further includes a pliable electrical heating element disposed between the first and the second cover layers and configured to convert electrical energy to heat energy and to distribute the heat energy. The pliable electrical heating element includes a heat generating element for converting electrical current to heat energy and a heat spreading element comprising graphite thermally coupled to the heat generating element. The heating unit further includes a thermal insulation layer positioned above the pliable electrical heating element and between the first and the second cover layers. A receiving power connector is electrically connected to the heat generating element. The receiving power connector configured to connect to a direct current power source.

15 Claims, 3 Drawing Sheets

Related U.S. Application Data continuation-in-part of application No. 11/744,163, filed on May 3, 2007, now abandoned, which is a continuation-in-part of application No. 11/218,156, filed on Sep. 1, 2005, now Pat. No. 7,230,213, said application No. 12/258,249 is a continuation-in-part of application No. 11/422,580, filed on Jun. 6, 2006, now Pat. No. 7,880,121, which is a continuation-in-part of application No. 11/218,156, filed on Sep. 1, 2005, now Pat. No. 7,230,213, and a continuation-in-part of application No. 11/344,830, filed on Feb. 1, 2006, now Pat. No. 7,183,524.

(60) Provisional application No. 61/013,963, filed on Dec. 14, 2007, provisional application No. 60/688,146, filed on Jun. 6, 2005, provisional application No. 60/654,702, filed on Feb. 17, 2005, provisional application No. 60/656,060, filed on Feb. 23, 2005, provisional application No. 60/688,146, filed on Jun. 6, 2005.

(51) Int. Cl.
    *E01C 23/03*     (2006.01)
    *H05B 1/02*     (2006.01)
    *H05B 3/36*     (2006.01)
    *F24D 13/02*     (2006.01)

(52) U.S. Cl.
CPC .......... *F24D 13/022* (2013.01); *H05B 2203/003* (2013.01); *H05B 2203/014* (2013.01); *H05B 2203/017* (2013.01); *H05B 2203/021* (2013.01); *H05B 2203/029* (2013.01); *Y02B 30/26* (2013.01)

(56) References Cited

U.S. PATENT DOCUMENTS

| | | | |
|---|---|---|---|
| 1,486,412 | A | 3/1924 | Biddlecom |
| 2,014,657 | A | 9/1935 | Marshall et al. |
| 2,342,077 | A | 2/1944 | Jepson |
| 2,550,040 | A | 4/1951 | Clar |
| 2,619,580 | A | 11/1952 | Pontiere |
| 2,666,840 | A | 1/1954 | Poirier |
| 2,697,163 | A | 12/1954 | Spear |
| 2,706,237 | A | 4/1955 | Hare et al. |
| 2,717,766 | A | 9/1955 | Becker |
| 2,745,942 | A | 5/1956 | Cohen |
| 2,779,526 | A | 1/1957 | Vogt |
| 2,870,319 | A | 1/1959 | Ford |
| 2,875,316 | A | 2/1959 | Ford et al. |
| 2,907,859 | A | 10/1959 | Walkoe |
| 2,963,565 | A | 12/1960 | Moore et al. |
| 3,040,925 | A | 6/1962 | Mills |
| 3,065,325 | A | 11/1962 | Schlaich |
| 3,108,173 | A | 10/1963 | Barrett et al. |
| 3,119,000 | A | 1/1964 | Loch et al. |
| 3,130,289 | A | 4/1964 | Katzman |
| 3,176,118 | A | 3/1965 | Scott |
| 3,233,097 | A | 2/1966 | Watkins |
| 3,345,497 | A | 10/1967 | Porteous |
| 3,348,470 | A | 10/1967 | Swanson |
| 3,380,087 | A | 4/1968 | Petty et al. |
| 3,417,229 | A | 12/1968 | Shomphe |
| 3,438,069 | A | 4/1969 | Long |
| 3,454,746 | A | 7/1969 | Dubois |
| 3,510,547 | A | 5/1970 | Eisler |
| 3,516,485 | A | 6/1970 | Mackay et al. |
| 3,649,725 | A | 3/1972 | Olson |
| 3,659,077 | A | 4/1972 | Olson |
| 3,662,512 | A | 5/1972 | Zelnick |
| 3,691,343 | A | 9/1972 | Norman |
| 3,694,622 | A | 9/1972 | Bentley |
| 3,723,708 | A | 3/1973 | Tulkoff |
| 3,729,614 | A | 4/1973 | Martinet |
| 3,782,628 | A | 1/1974 | Beaudet |
| 3,812,320 | A | 5/1974 | Borgren |
| 3,852,569 | A | 12/1974 | Potvin |
| 3,865,825 | A | 3/1975 | Boyce |
| 3,868,825 | A | 3/1975 | Boyce |
| 3,881,091 | A | 4/1975 | Day |
| 3,896,288 | A | 7/1975 | Tulkoff |
| 3,897,928 | A | 8/1975 | Eisler |
| 3,938,431 | A | 2/1976 | Potvin |
| 3,968,348 | A | 7/1976 | Stanfield |
| 3,988,791 | A | 11/1976 | Simon |
| 4,000,815 | A | 1/1977 | Wingbro |
| 4,060,710 | A | 11/1977 | Reuter |
| 4,091,266 | A | 5/1978 | Ito |
| 4,238,105 | A | 12/1980 | West |
| 4,239,956 | A | 12/1980 | Morton |
| 4,244,411 | A | 1/1981 | Karlstrom |
| 4,250,397 | A | 2/1981 | Gray |
| 4,250,398 | A | 2/1981 | Ellis |
| 4,303,074 | A | 12/1981 | Bender |
| 4,316,080 | A | 2/1982 | Wroblewski |
| 4,401,880 | A | 8/1983 | Eizenhoefer |
| 4,423,694 | A | 1/1984 | Senneville |
| 4,457,491 | A | 7/1984 | Dudman |
| 4,485,297 | A | 11/1984 | Grise |
| 4,535,222 | A | 8/1985 | Moen |
| 4,542,282 | A | 9/1985 | Brasky |
| 4,549,069 | A | 10/1985 | Oge |
| 4,607,154 | A | 8/1986 | Mills |
| 4,625,394 | A | 12/1986 | Kemnitz |
| 4,773,105 | A | 9/1988 | Toyoshima |
| 4,810,859 | A | 3/1989 | Ababtawi |
| 4,832,881 | A | 5/1989 | Arnold |
| 4,855,573 | A | 8/1989 | Vercillo |
| 4,899,031 | A | 2/1990 | Dyer |
| 4,901,266 | A | 2/1990 | Takagi |
| 4,919,270 | A | 4/1990 | Govang et al. |
| 4,919,744 | A | 4/1990 | Newman |
| 4,922,084 | A | 5/1990 | Hutter |
| 4,931,627 | A | 6/1990 | Watts |
| 4,935,602 | A | 6/1990 | Bravo |
| 4,967,057 | A | 10/1990 | Bayless |
| 4,967,097 | A | 10/1990 | Mehl |
| 5,005,531 | A | 4/1991 | Nelson |
| 5,049,724 | A | 9/1991 | Anderson |
| 5,181,006 | A | 1/1993 | Shafe |
| 5,198,063 | A | 3/1993 | Howard |
| 5,201,868 | A | 4/1993 | Johnson |
| 5,309,981 | A | 5/1994 | Binder |
| 5,371,340 | A | 12/1994 | Stanfield |
| 5,397,875 | A | 3/1995 | Bechtold |
| 5,451,747 | A | 9/1995 | Sullivan |
| 5,499,621 | A | 3/1996 | Trihey |
| 5,550,350 | A | 8/1996 | Barnes |
| 5,557,704 | A | 9/1996 | Dennis et al. |
| 5,590,478 | A | 1/1997 | Furness |
| 5,591,365 | A | 1/1997 | Shields |
| 5,601,143 | A | 2/1997 | Binder |
| 5,601,232 | A | 2/1997 | Greenlee |
| 5,614,292 | A | 3/1997 | Saylor |
| 5,669,221 | A | 9/1997 | LeBleu |
| 5,684,689 | A * | 11/1997 | Hahn ........................... 363/146 |
| 5,704,487 | A | 1/1998 | Taravella et al. |
| 5,780,367 | A | 7/1998 | Handwerker |
| 5,824,996 | A | 10/1998 | Kochman |
| 5,827,050 | A | 10/1998 | Price |
| 5,830,809 | A | 11/1998 | Howard |
| 5,854,470 | A | 12/1998 | Silva |
| 5,887,119 | A | 3/1999 | Wesseltoft |
| 5,918,744 | A | 7/1999 | Bringard et al. |
| 5,946,933 | A | 9/1999 | Clarke et al. |
| 5,974,820 | A | 11/1999 | Boyd |
| 5,974,830 | A | 11/1999 | Colero |
| 5,986,243 | A | 11/1999 | Campf |
| 5,990,454 | A | 11/1999 | Westerberg |
| 5,994,669 | A | 11/1999 | McCall |
| 6,051,811 | A | 4/2000 | Hardison |

(56) References Cited

U.S. PATENT DOCUMENTS

| | | | |
|---|---|---|---|
| 6,051,812 | A | 4/2000 | Walker |
| 6,057,530 | A | 5/2000 | Gurevich |
| 6,160,246 | A | 12/2000 | Rock et al. |
| 6,180,929 | B1 | 1/2001 | Pearce |
| 6,184,496 | B1 | 2/2001 | Pearce |
| 6,189,487 | B1 | 2/2001 | Owen |
| 6,202,849 | B1 | 3/2001 | Graham |
| 6,211,493 | B1 | 4/2001 | Bouman |
| 6,222,160 | B1 | 4/2001 | Remke |
| 6,245,400 | B1 | 6/2001 | Tzeng |
| 6,279,856 | B1 | 8/2001 | Rutherford |
| 6,294,761 | B1 | 9/2001 | Diederich |
| 6,294,768 | B1 | 9/2001 | Liebich |
| 6,303,905 | B1 | 10/2001 | Chiles |
| 6,330,986 | B1 | 12/2001 | Rutherford |
| 6,392,209 | B1 | 5/2002 | Oppitz |
| 6,426,488 | B2 | 7/2002 | Schielke |
| 6,426,489 | B1 | 7/2002 | Elsasser |
| 6,432,336 | B1 | 8/2002 | Mercuri |
| 6,452,138 | B1 | 9/2002 | Kochman |
| 6,482,520 | B1 | 11/2002 | Tzeng |
| 6,483,087 | B2 | 11/2002 | Gardner |
| 6,503,626 | B1 | 1/2003 | Norley |
| 6,550,645 | B2 | 4/2003 | Nelson et al. |
| 6,614,992 | B2 | 9/2003 | Schmitt |
| 6,631,603 | B2 | 10/2003 | Zornes |
| 6,657,170 | B2 | 12/2003 | Clothier |
| 6,664,520 | B2 | 12/2003 | Clothier |
| 6,667,100 | B2 | 12/2003 | Rutherford |
| 6,673,284 | B2 | 1/2004 | Mercuri |
| 6,673,289 | B2 | 1/2004 | Reynolds |
| 6,675,723 | B2 | 1/2004 | Sukeva |
| 6,687,927 | B1 | 2/2004 | Tharalson et al. |
| 6,740,381 | B2 | 5/2004 | Day |
| 6,746,768 | B2 | 6/2004 | Greinke |
| 6,770,848 | B2 | 8/2004 | Haas et al. |
| 6,782,640 | B2 | 8/2004 | Westin |
| 6,797,251 | B1 | 9/2004 | Bennett |
| 6,822,198 | B2 | 11/2004 | Rix |
| 6,841,250 | B2 | 1/2005 | Tzeng |
| 6,841,757 | B2 | 1/2005 | Marega et al. |
| 6,848,200 | B1 | 2/2005 | Westin |
| 6,855,915 | B2 | 2/2005 | Gehring |
| 6,886,233 | B2 | 5/2005 | Rutherford |
| 6,897,417 | B1 | 5/2005 | Usselman |
| 6,931,756 | B2 | 8/2005 | Morgan |
| 6,943,320 | B1 | 9/2005 | Bavett |
| 6,982,874 | B2 | 1/2006 | Smalc |
| 7,049,559 | B2 | 5/2006 | Ishii |
| 7,108,055 | B2 | 9/2006 | Krassowski |
| 7,161,809 | B2 | 1/2007 | Ford |
| 7,166,912 | B2 | 1/2007 | Tzeng |
| 7,182,222 | B2 | 2/2007 | Prabucki |
| 7,183,524 | B2 | 2/2007 | Naylor |
| 7,186,309 | B2 | 3/2007 | Mercuri |
| 7,230,213 | B2 | 6/2007 | Naylor |
| 7,232,601 | B2 | 6/2007 | Mercuri |
| 7,285,748 | B2 | 10/2007 | Nelson et al. |
| 7,393,577 | B2 | 7/2008 | Day |
| 7,393,587 | B2 | 7/2008 | Krassowski |
| 7,880,121 | B2 | 2/2011 | Naylor |
| 7,975,879 | B2 | 7/2011 | Groesbeck |
| 8,258,443 | B2 | 9/2012 | Caterina |
| 2002/0164483 | A1 | 11/2002 | Mercuri |
| 2003/0052114 | A1 | 3/2003 | Ek et al. |
| 2003/0080114 | A1 | 5/2003 | Harashima |
| 2003/0085215 | A1 | 5/2003 | Rix |
| 2003/0097763 | A1 | 5/2003 | Morgan |
| 2003/0154736 | A1 | 8/2003 | Lloyd |
| 2003/0155347 | A1 | 8/2003 | Oh et al. |
| 2003/0164361 | A1 | 9/2003 | Marega et al. |
| 2004/0004066 | A1 | 1/2004 | Evans |
| 2004/0021529 | A1 | 2/2004 | Bradley et al. |
| 2004/0025784 | A1 | 2/2004 | Kawamura |
| 2004/0035853 | A1 | 2/2004 | Pais |
| 2004/0221529 | A1 | 11/2004 | Zornes |
| 2004/0226309 | A1 | 11/2004 | Broussard |
| 2005/0160620 | A1 | 7/2005 | Morgan |
| 2006/0289000 | A1 | 12/2006 | Naylor |
| 2006/0289426 | A1 | 12/2006 | Naranjo et al. |
| 2006/0289468 | A1 | 12/2006 | Seibert |
| 2007/0181561 | A1 | 8/2007 | Turletes |
| 2007/0262073 | A1 | 11/2007 | Naylor |
| 2008/0272106 | A1 | 11/2008 | Naylor |
| 2008/0277417 | A1 | 11/2008 | Groesbeck |
| 2009/0056244 | A1 | 3/2009 | Caterina |
| 2009/0101305 | A1 | 4/2009 | Clark |
| 2009/0101632 | A1 | 4/2009 | Naylor |
| 2009/0107972 | A1 | 4/2009 | Naylor |
| 2009/0107975 | A1 | 4/2009 | Caterina |
| 2009/0107986 | A1 | 4/2009 | Naylor |
| 2009/0114633 | A1 | 5/2009 | Naylor |
| 2009/0114634 | A1 | 5/2009 | Naylor |
| 2009/0127251 | A1 | 5/2009 | Naylor |
| 2009/0302023 | A1 | 12/2009 | Caterina |
| 2009/0302027 | A1 | 12/2009 | Caterina |
| 2011/0006080 | A1 | 1/2011 | Naylor et al. |
| 2011/0174802 | A1 | 7/2011 | Naylor |
| 2011/0266287 | A1 | 11/2011 | Groesbeck |
| 2012/0328274 | A1 | 12/2012 | Naylor |

FOREIGN PATENT DOCUMENTS

| | | |
|---|---|---|
| CA | 2598045 | 8/2006 |
| CA | 2685387 | 11/2008 |
| CA | 2680555 | 3/2010 |
| CA | 2684115 | 5/2010 |
| CA | 2684178 | 5/2010 |
| GB | 1387409 | 3/1975 |
| JP | 2004350257 | 12/1992 |
| JP | 2006129095 | 5/1994 |
| JP | 2001123667 | 5/2001 |
| WO | 2006088710 | 8/2006 |
| WO | 2008137726 | 11/2008 |
| WO | 2008137727 | 11/2008 |
| WO | 2009140194 | 11/2009 |
| WO | 2012170013 | 12/2012 |

OTHER PUBLICATIONS

U.S. Appl. No. 12/875,313, filed Sep. 3, 2010, Naylor.
U.S. Appl. No. 13/607,531, filed Sep. 7, 2012, Naylor.
"Thawzall Heater" http://www.themachinecompany.com/faq.htm.
"Q Foil Performance" http://www.rotabolt.com.html/qfoil__1.html.
"Q Foil Technology" http://www.rotabolt.com.html/qfoil.html.
"Q Foil Product Features" http://www.rotabolt.com.html/qfoil__2.html.
"Thawzall Product Selection" http://www.themachinecompany.com/products.htm.
"Ground Heaters S3000" http://www.groundheaters.com/s3000.htm.
"How it Works" http://www.groundheaters.com/how__it__works.htm.
"FP Parallel Constant Watt Heating Cable" Thermon Manufacturing Co.
"SCS Concrete Curing Blankets" http://www.scsincorporated.com/curingblankets.htm.
"Mauritzon Concrete Curing Blankets" http://www.mauritzononline.com.concretecure.html.
"Concrete-Curing-Blankets.Com" http://concrete-curing-blankets.com.
"Janell Concrete Curing Methods" http://www.janell.com/engineering__data.html.
"GrafTech Material Safety Data Sheet" May 17, 2005.
Concrete Curing Technology, Inc. "Instructions for Use of Pad".
"Electrical Floor Heating", portion of catalog from Heating Catalog, http://www.wattsradiant.com.
"The Future Looks Radiant", Full Line Radiant Catalong, http://www.wattsradiant.com 2007.
"Hotmesh", various pages from website, http://www.worldscientificdevelopment.com/hotmesh/motivation.html.

(56) References Cited

OTHER PUBLICATIONS

"GO Polymers" http://www.gopolymers.com/index.php?module-abs.
Julian Norley and Gary Chen "GrafTech High Performance, Lightweight Graphite Heat Sinks/Spreaders" IEEE 2002.
GRAFOIL Flexible Graphite "Typical Grafoil Sheet Properties".
"Springfield Wire Inc." http://www.springfield-wire.com/category.cfm?Category=21.
GrafTech International "Dramatically Improve Your Radiant Floor Heating Performance" Copyright 2008 GrafTech International Holdings Inc. 1 page.
U.S. Appl. No. 11/422,580, Mail Date Mar. 15, 2007, Office Action.
U.S. Appl. No. 11/422,580, Mail Date Jul. 27, 2007, Office Action.
U.S. Appl. No. 11/422,580, Mail Date Dec. 11, 2008, Office Action.
U.S. Appl. No. 11/422,580, Mail Date Nov. 16, 2009, Notice of Allowance.
U.S. Appl. No. 11/422,580, Mail Date Apr. 15, 2010, Notice of Allowance.
U.S. Appl. No. 11/422,580, Mail Date Aug. 17, 2010, Notice of Allowance.
U.S. Appl. No. 11/422,580, Mail Date Nov. 22, 2010, Notice of Allowance.
U.S. Appl. No. 11/835,641, Mail Date Sep. 1, 2010, Office Action.
U.S. Appl. No. 12/119,434, Mail Date Sep. 29, 2010, Office Action.
U.S. Appl. No. 12/119,434, Mail Date Mar. 3, 2011, Notice of Allowance.
U.S. Appl. No. 12/119,434, Mail Date Jun. 14, 2011, Notice of Allowance.
U.S. Appl. No. 12/212,529, Mail Date Sep. 23, 2011, Office Action.
U.S. Appl. No. 12/119,434, Mail Date Oct. 26, 2011, Notice of Allowance.
U.S. Appl. No. 12/258,249, Mail Date Mar. 7, 2012, Office Action.
U.S. Appl. No. 12/875,305, Mail Date Mar. 8, 2012, Office Action.
U.S. Appl. No. 12/258,240, Mail Date Mar. 14, 2012, Office Action.
U.S. Appl. No. 12/264,480, Mail Date Mar. 14, 2012, Office Action.
U.S. Appl. No. 12/119,434, Mail Date Mar. 14, 2012, Notice of Allowance.
U.S. Appl. No. 12/119,434, Mail Date May 29, 2012, Notice of Allowance.
U.S. Appl. No. 12/433,974, Mail Date Sep. 17, 2012, Office Action.
U.S. Appl. No. 12/212,529, Mail Date May 11, 2012, Final Office Action.
U.S. Appl. No. 12/264,460, Mail Date Aug. 20, 2012, Office Action.
U.S. Appl. No. 12/843,523, Mail Date Mar. 1, 2013, Office Action.
U.S. Appl. No. 12/264,460, Mail Date Mar. 28, 2013, Final Office Action.
U.S. Appl. No. 12/433,974, Mail Date Apr. 11, 2013, Final Office Action.
U.S. Appl. No. 12/843,523, Mail Date Sep. 16, 2013, Notice of Allowance.
U.S. Appl. No. 13/607,531, Mail Date Oct. 10, 2013, Office Action.
U.S. Appl. No. 12/264,460, Mail Date Jan. 31, 2014, Office Action.
U.S. Appl. No. 11/218,156, Mail Date Jan. 25, 2006, Office Action.
U.S. Appl. No. 11/218,156, Mail Date Aug. 28, 2006, Office Action.
U.S. Appl. No. 11/218,156, Mail Date Feb. 7, 2007, Notice of Allowance.
U.S. Appl. No. 11/344,830, Mail Date Jun. 22, 2006, Office Action.
U.S. Appl. No. 11/344,830, Mail Date Nov. 29, 2006, Notice of Allowance.
U.S. Appl. No. 12/433,974, Mail Date Aug. 7, 2014, Office Action.
U.S. Appl. No. 12/264,460, Mail Date Sep. 8, 2014, Notice of Allowance.
U.S. Appl. No. 12/212,529, Mail Date Jun. 18, 2014, Office Action.
U.S. Appl. No. 14/107,697, Mail Date Dec. 16, 2013, Notice of Allowance.
U.S. Appl. No. 12/212,529, Mail Date Oct. 6, 2015, Office Action.
International Search Report and Written Opinion for PCT/US2005/037414 dated Mar. 7, 2006.
International Search Report and Written Opinion for PCT/US2006/04437 dated Jul. 3, 2006.
International Search Report and Written Opinion for PCT/US2008/62481 dated Sep. 17, 2008.
Internationsl Search Report and Written Opinion for PCT/US2008/62479 dated Sep. 22, 2008.
International Search Report and Written Opinion for PCT/US2009/043443 dated Jul. 2, 2009.
International Search Report and Written Opinion for PCT/US2011/039489 dated Oct. 19, 2011.
U.S. Appl. No. 12/264,493, Mail Date Mar. 5, 2010, Office Action.
U.S. Appl. No. 12/260,021, Mail Date Mar. 5, 2010, Office Action.
U.S. Appl. No. 12/264,469, Mail Date Mar. 8, 2010, Office Action.
U.S. Appl. No. 14/107,697, Mail Date May 13, 2014, Notice of Allowance.
U.S. Appl. No. 14/107,697, Mail Date Jul. 21, 2014, Notice of Allowance.
U.S. Appl. No. 14/107,697, Mail Date Oct. 3, 2014, Notice of Allowance.
U.S. Appl. No. 12/264,460, Mail Date Dec. 26, 2014, Notice of Allowance.
U.S. Appl. No. 13/607,649, Mail Date Mar. 12, 2015, Office Action.
U.S. Appl. No. 12/433,974, Mail Date Apr. 20, 2015, Final Office Action.
U.S. Appl. No. 12/212,529, Mail Date May 8, 2015, Final Office Action.

* cited by examiner

HEATING UNIT FOR DIRECT CURRENT APPLICATIONS

CROSS-REFERENCE TO RELATED APPLICATIONS

This application is a continuation of U.S. application Ser. No. 12/258,249, filed on Oct. 24, 2008 now abandoned, and titled HEATING UNIT FOR DIRECT CURRENT APPLICATIONS, which claims priority to U.S. Provisional Patent Application Ser. No. 61/013,963, filed on Dec. 14, 2007, and titled HEATING UNIT FOR AUTOMOTIVE APPLICATIONS. U.S. application Ser. No. 12/258,249, filed on Oct. 24, 2008, and titled HEATING UNIT FOR DIRECT CURRENT APPLICATIONS, is also a continuation-in-part of U.S. application Ser. No. 11/835,641, filed on Aug. 8, 2007 now abandoned , and titled GROUNDED MODULAR HEATED COVER, which is a continuation-in-part of U.S. patent application Ser. No. 11/744,163, filed on May 3, 2007 now abandoned , and titled MODULAR HEATED COVER, which is a continuation-in-part of U.S. patent application Ser. No. 11/218,156, filed on Sep. 1, 2005, and titled MODULAR HEATED COVER, now U.S. Pat. No. 7,230,213, issued Jun. 12, 2007. U.S. application Ser. No. 12/258,249, filed on Oct. 24, 2008, and titled HEATING UNIT FOR DIRECT CURRENT APPLICATIONS, is also a continuation-in-part of U.S. application Ser. No. 11/422,580, filed on Jun. 6, 2006 now U.S. Pat. No. 7,880,121, and titled A RADIANT HEATING APPARATUS, which claims priority to U.S. Provisional Patent Application Ser. No. 60/688,146, filed on Jun. 6, 2005, and titled LAMINATE HEATING APPARATUS. U.S. application Ser. No. 11/422,580, filed on Jun. 6, 2006, and titled A RADIANT HEATING APPARATUS, is also a continuation-in-part of U.S. patent application Ser. No. 11/218,156, filed on Sep. 1, 2005, now U.S. Pat. No. 7,230,213, issued on Jun. 12, 2007, which claims priority to: U.S. Provisional Patent Application Ser. No. 60/654,702, filed on Feb. 17, 2005, and titled A MODULAR ACTIVELY HEATED THERMAL COVER; U.S. Provisional Patent Application Ser. No. 60/656,060, filed on Feb. 23, 2005, and titled A MODULAR ACTIVELY HEATED THERMAL COVER; and U.S. Provisional Patent Application Ser. No. 60/688,146, filed on Jun. 6, 2005, and titled LAMINATE HEATING APPARATUS. U.S. application Ser. No. 11/422,580, filed on Jun. 6, 2006, and titled A RADIANT HEATING APPARATUS, is also a continuation-in-part of U.S. patent application Ser. No. 11/344,830, filed on Feb. 1, 2006, now U.S. Pat. No. 7,183,524, issued on Feb. 27, 2007, which claims priority to: U.S. Provisional Patent Application Ser. No. 60/654,702, filed on Feb. 17, 2005, and titled A MODULAR ACTIVELY HEATED THERMAL COVER; U.S. Provisional Patent Application Ser. No. 60/656,060, filed on Feb. 23, 2005, and titled A MODULAR ACTIVELY HEATED THERMAL COVER; and U.S. Provisional Patent Application Ser. No. 60/688,146, filed on Jun. 6, 2005, and titled LAMINATE HEATING APPARATUS. Each of the foregoing patent applications and patents is incorporated herein by reference in its entirety

BACKGROUND

Background and Relevant Art

The ability to distribute heat has provided a number of opportunities for increasing human comfort levels for certain activities and has made other activities not previously feasible able to be accomplished. For example, automobile heaters, which use heat generated by the engine of the automobile, make driving in winter or other cold conditions more comfortable for automobile drivers and passengers.

As another example, heat generated by electrical means has been widely used. Typically heat generated by electrical means is generated from power supplied by a power generator such as a utility company facility or a gas or diesel powered electrical generator. This power could be used to heat homes or other spaces; provide heat to appliances such as hair dryers and hair irons, provide heat to cooking devices; provide heat to engine warming elements to allow cars to start in cold weather conditions, etc. However, using this type of heat generation, it is difficult to have portable heat generation where heat can be generated while the recipient of the heat is in motion or located away from a large immobile source of electrical energy.

Automobiles do have some mobile heat generating capabilities. For example, using electrical heating elements disposed on a rear window, where the heating elements are connected to an automobiles electrical system, defrosting functionality can be accomplished. As another example, some automobiles include heated seats which have power supplied by the automobile electrical system. However, these systems suffer from the drawback of uneven heat distribution. This is illustrated distinctly when one observes a rear window being defrosted. The frost is removed most quickly at the points where the electrical traces are located while frost removal expands slowly there from.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein is directed to a direct current powered electrical heating unit capable of distributing heat across the heating unit in a substantially uniform fashion. The heating unit includes a first pliable outer layer and a second pliable outer layer. The heating unit further includes a pliable electrical heating element disposed between the first and the second cover layers and configured to convert electrical energy to heat energy and to distribute the heat energy. The pliable electrical heating element includes a heat generating element for converting electrical current to heat energy and a heat spreading element comprising graphite thermally coupled to the heat generating element. The heating unit further includes a thermal insulation layer positioned above the pliable electrical heating element and between the first and the second cover layers. A receiving power connector is electrically connected to the heat generating element. The receiving power connector configured to connect to a direct current power source, such as by hard wiring, alligator clips, cigarette lighter plug, automobile connector, trailer hitch connector or other appropriate connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed herein are embodiments of a heating unit for use in direct current applications, such as automotive or other applications using direct current power supplies. Embodiments illustrated include details related to direct current (DC) embodiments, and in particular, some embodiments are particularly suited for 12V DC automotive embodiments. This allows for the heating unit to be used in a number of unique and novel ways. For example, while most engine heaters have required that an automobile be located near a distributed power source, such as a power source receiving power directly from power company generators, embodiments herein allow engine heaters, fuel tank heaters, window and windshield heaters, personal and pet heaters, interior heaters, etc. to be implemented in a fashion that allows them to be used without the availability of direct power company distributed power, but rather by using a vehicle's own 12 Volt battery or alternator supplied power. Thus, embodiments may be implemented where heat is supplied while an automobile is located remotely from a power company supplied power source. Other non-automotive uses will also be discussed below. For example, embodiments may be implemented with portable batteries or other power sources.

Additionally, heating may be supplied in mobile environments. For example, in cold environments, a heating element may be mounted to an external fuel tank, or to other portions of an automobile, and connected electrically to the automobiles power source, such as by hard wiring, connection through a cigarette lighter plug or utility plug, or connection via a clip to battery terminals, etc., such that heat can be provided while the automobile is in motion.

Figure 1:
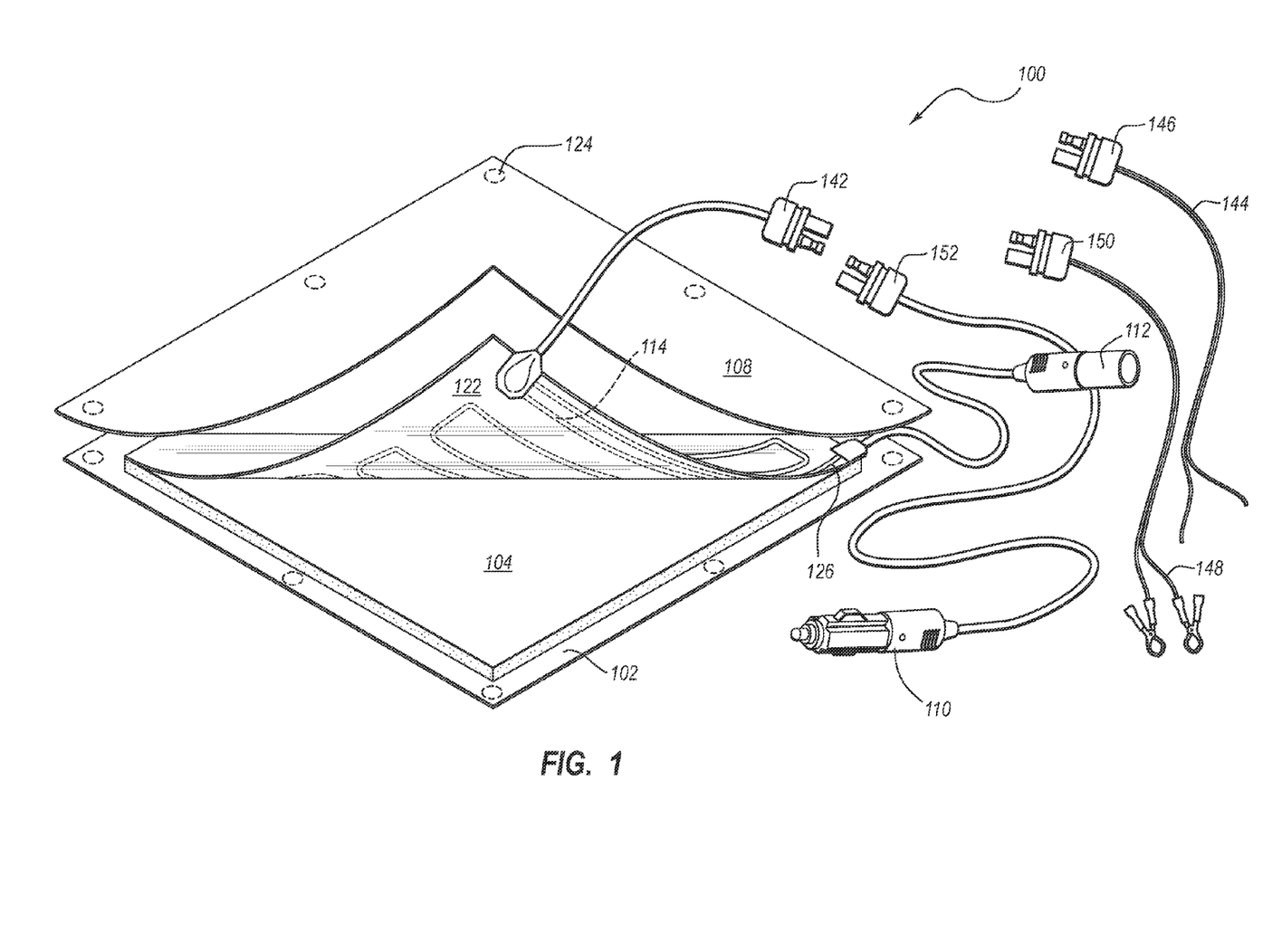
FIG. 1 illustrates a partially exploded view of a direct current supplied heating apparatus.
Figure 2:
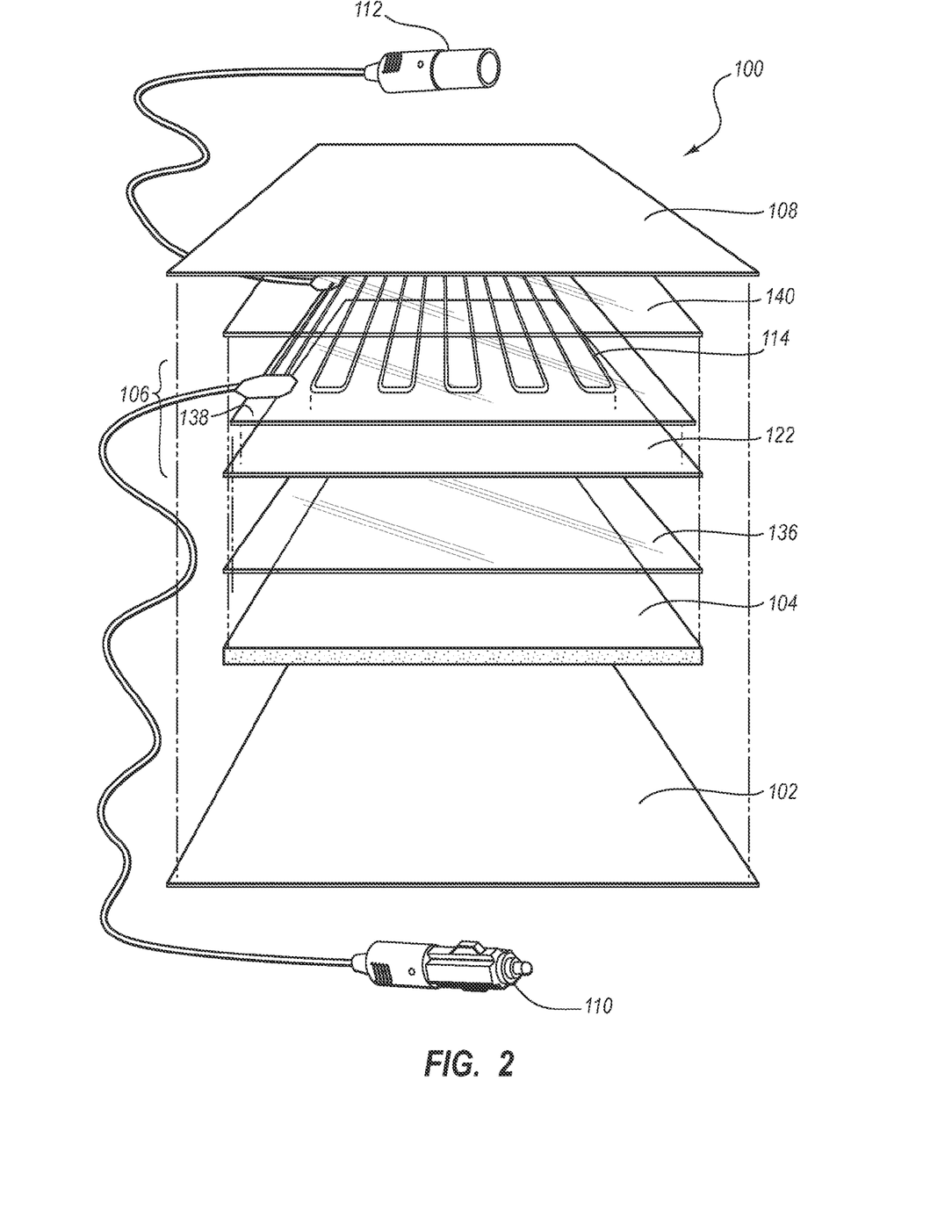
FIG. 2 illustrates an exploded view of a direct current supplied heating apparatus.

An example of one embodiment is illustrated in FIGS. 1 and 2. FIG. 1 illustrates a partially exploded view illustrating the flexible nature of a heating unit 100 that includes a first cover layer 102, an insulation layer 104, a heating element 106 (see FIG. 2), and a second cover layer 108. The heating unit 100 further includes an incoming direct current electrical connection 110 and an outgoing direct current electrical connection 112. While the example illustrated in FIG. 1 is illustrated as partially exploded, some finished embodiments may be manufactured such that the insulation layer 104 and the heating element 106 may be sealed between the first cover layer 102 and the second cover layer 108. Sealing processes and details will be discussed in more detail below. FIG. 2 illustrates a fully exploded view of the heating unit 100 so as to more clearly illustrate the individual components of the heating unit 100.

FIG. 2 illustrates a fully exploded view of the heating unit 100 so as to more clearly illustrate the individual components of the heating unit 100. As illustrated in FIG. 2, first and second cover layers 102 and 108 are generally planar sheets of material that are disposed on opposing sides of the internal components of heating unit 100. During construction of heating unit 100, first cover layer 102 is positioned as illustrated in FIG. 2. Next, insulation layer 104 is positioned on top of first cover layer 102 and heating element 106 is then positioned on top of insulation layer 104. Finally, second cover layer 108 is positioned on top of heating element 106. With the various components of heating unit 100 so positioned, the peripheral edges of first and second layers 102 and 108 can be joined, sealed, or otherwise closed.

Heating unit 100, constructed as described herein, can be used in numerous applications that require heat to be transferred to an object or surface. As described herein, the various components of heating unit 100 are flexible such that heating unit 100 can be wrapped around objects, laid on top, beneath, or hung adjacent objects or surfaces, and rolled or folded up when not in use. In order to ensure that heating unit 100 and its various components retain their shape and their positions relative to one another, the various components of heating unit 100 can be attached to one another. For example, the various components of heating unit 100 can be glued, bonded, or otherwise held together. Attaching the components of heating unit 100 together helps to prevent the components from moving relative to one another within heating unit 100.

For example, attaching heating element 106 to insulation layer 104 ensures that heating element 106 will stay positioned next to insulation layer 104 and will not sag, bunch, or otherwise move within heating unit 100. In particular, because insulation layer 104 is formed of a stiffer material than heating element 106, attaching heating element 106 to insulation layer 106 provides stiffness to heating element 106. While insulation layer 104 is referred to as being formed of a "stiffer" material, it will be appreciated that in some embodiments insulation layer 104 may still be flexible such that it can be wrapped around a barrel or folded around a box, for example. Similarly, heat generating strip 114 and heat spreading element 122 can be attached to one another to ensure that heat generating strip 114 is properly positioned on heat spreading element 122, even after heating unit 100 is rolled, folded, and used several times. Likewise, heating element 106 and/or insulation layer 104 can be attached to first and/or second cover layers 102 and 108 to prevent the internal components of heating unit 100 from moving within first and second cover layers 102 and 108.

In the embodiment illustrated in FIG. 2, there are three interfaces between the heating unit components for attachment between the components. As used herein, an attachment interface is a surface where two or more components of heating unit 100 are attached together. The first attachment interface 136 is between the top surface of insulation layer 104 and the bottom surface of heat spreading element 122. The second attachment interface 138 is between the top surface of heat spreading element 122 and the bottom surface of heat generating strip 114. The third attachment interface 140 is between the top surfaces of heat spreading element 122 and heat generating strip 114 and the bottom surface of second cover layer 108. In another embodiment, there is a fourth attachment interface between the bottom surface of insulation layer and the top surface of first cover layer 102.

Attachment interfaces 136, 138, and 140 can be created by attaching the above identified components of heating unit 100 in any suitable manner so that the components maintain their relative positions one to another. Any, all, or none of the interfaces implement more secure attachment in various alternative embodiments. As used herein, an attachment interface is a surface where two or more components of heating unit 100 can be attached together. In one exemplary embodiment, attachment interfaces 136, 138, and 140 are created using an adhesive between the components of heating unit 100. One such adhesive suitable for attaching together the components of heating unit 100 is 30-NF FASTBOND™ available from 3M located in St. Paul, Minn. FASTBOND™ is a non-flammable, heat resistant, polychloroprene base adhesive.

To properly adhere the components of heating unit 100 together with FASTBOND™, the interfacing surfaces should be clean and dry. With the surfaces prepared, a uniform coat of FASTBOND™ is applied to both interfacing surfaces. After applying, the FASTBOND™ is allowed to dry completely, which typically takes about 30 minutes. Once the FASTBOND™ on both surfaces is dry, the two FASTBOND™ coated surfaces are joined together.

For example, when attaching insulation layer 104 to heat spreading element 122, a coat of FASTBOND™ is applied to the top surface of insulation layer 104 and the bottom surface of heat spreading element 122. Once the FASTBOND™ on each surface is dry, heat spreading element 122 is positioned on top of insulation layer 104 and the two layers of FASTBOND™ adhere to one another. The same process can be followed to attach heat generating element 114 to the top surface of heat spreading element 122 and to attach second cover layer 108 to the top surfaces of heat generating element 114 and heat spreading element 122.

In the illustrated embodiment, second cover layer 108 is attached to heating element 106 and heating element is attached to insulation layer 104. Notably, insulation layer 104 is not attached to first cover layer 102. Not attaching insulation layer 104 to first cover layer 102 provides for flexibility and give in heating unit 100 when heating unit 100 is folded, rolled, or wrapped around an object. Specifically, heating unit 100 is configured to be wrapped around an object such that second cover layer 108 is adjacent the object and first cover layer 102 is positioned away from the object (see FIG. 1 in which first cover layer 102 is showing). When first cover layer 102 is not attached to insulation layer 104, first cover layer 102 is able to move relative to insulation layer 104 and stretch as heating unit 100 is wrapped around an object. In other embodiment, however, insulation layer 104 and first cover layer 102 are attached to one another. For example, when heating unit 100 is used on flat surfaces, such as the ground or a roof, the need for first cover layer 102 to be able to move relative to insulation layer 104 is not as great.

Figure 3:
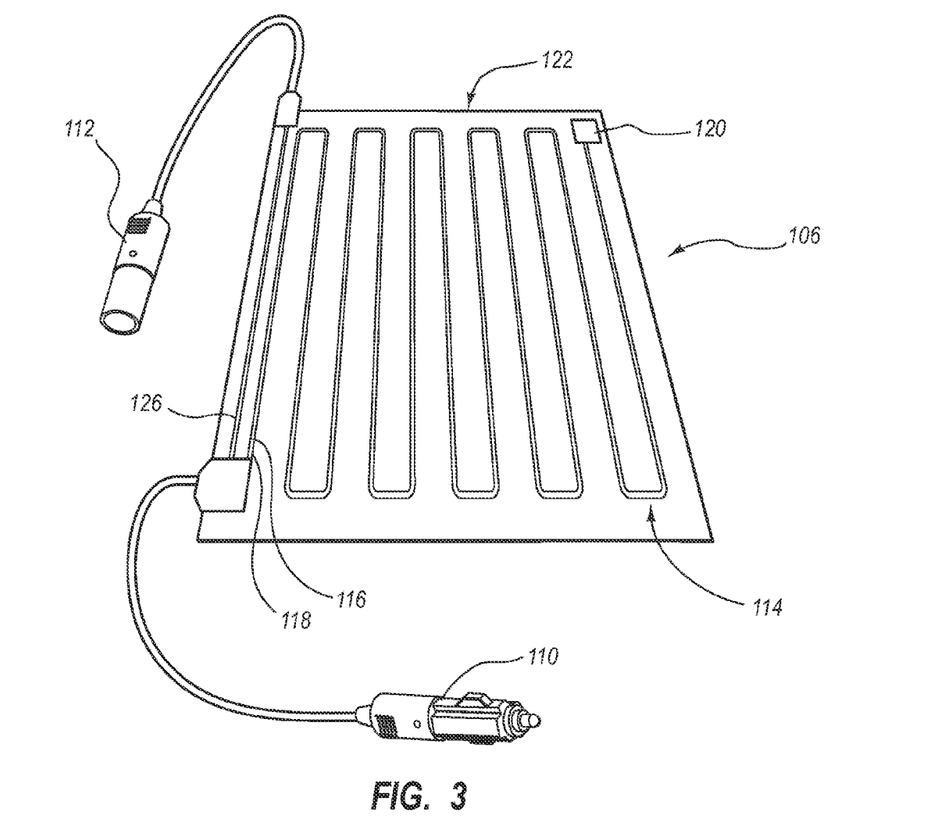
FIG. 3 illustrates details of a heat spreading element of the heating apparatus.

The following discussion will now treat additional details and embodiments of the various components of the heating unit 100. Referring now to FIG. 3, in some embodiments, the heating element 106 includes a heat generating element 114. The heat generating element 114 may be, for example, an electro-thermal coupling material or resistive element. In some embodiments, the heat generating element may be a copper, copper alloy or other conductor. The conductor may convert electrical energy to heat energy, and transfer the heat energy to the surrounding environment. In some embodiments, the heat generating element 114 is configured to generate a given amount of heat per linear foot. For example, some embodiments may include heat generating elements that deliver 9 Watts per linear foot. This may be achieved by selection of appropriate alloys for the heat generating element 114 in combination with selection of appropriate heat generating element wire sizes and circuit configurations.

Alternatively, the heat generating element 114 may comprise another conductor, such as semiconductors, ceramic conductors, other composite conductors, etc., capable of converting electrical energy to heat energy.

The heat generating element 114 may include one or more layers for electrical insulation, temperature regulation, and ruggedization.

Referring now to FIG. 3, the heat generating element 114 is illustrated with two heat generating conductors 116 and 118. One of the two conductors is connected to a positive terminal of the incoming direct current electrical 110 connection while the other conductor is connected to a negative terminal of the direct current electrical connection 110. The two conductors 116 and 118 may be connected at one end to create a closed circuit allowing current to flow through the two conductors to generate heat.

In the example illustrated in FIG. 3, the two conductors are connected through a thermostat 120. In this example, the thermostat 120 includes a bi-metal strip based temperature control that disconnects the two conductors 116 and 120 about a pre-determined temperature. This can be used to regulate the temperature of the heating unit 100 to prevent overheating, or to maintain the temperature at a temperature of about the pre-determined temperature. Embodiments may be implemented where the temperature is determined by selecting a thermostat 120 with a fixed temperature rating. Other embodiment may be implemented where the temperature setting of the thermostat can be adjusted to a predetermined temperature at manufacturing time. In some embodiments, the thermostat may be user accessible to allow a user to adjust the thermostat settings. While in the example illustrated the thermostat is located at the ends of the conductors 116 and 118, it should be appreciated that in other embodiments the thermostat may be placed in-line with one of the conductors 116 and 118.

It should further be appreciated that embodiments may be implemented where other temperature or current protections are included. For example, embodiments may include magnetic and/or thermal circuit breakers, fuses, semiconductor based over-current protection, etc. In some embodiments, these may be located at the ends of the conductors 116 and 118 or inline with one or more of the conductors 116 and 118 as appropriate.

The electrical heating element may further include a heat spreading element. In general terms, the heat spreading element 122 is a layer of material capable of drawing heat from the heat generating element 114 and distributing the heat energy away from the heat generating element 114. Specifically, the heat spreading element 122 may comprise a metallic foil, wire mesh, carbon mesh, graphite, a composite material, or other material.

The heat-spreading element 122 in one embodiment is an electrically-conductive material comprising carbon. Graphite is one example of an electrically-conductive material comprising carbon. However, other suitable materials may include carbon-based powders, carbon fiber structures, or carbon composites. Those of skill in the art will recognize that material comprising carbon may further comprise other elements, whether they represent impurities or additives to provide the material with particular additional features. Materials comprising carbon may be suitable so long as they have sufficient thermal conductivity to act as a heat-spreading element. The heat-spreading element 122 may further comprise a carbon derivative, or a carbon allotrope.

One example of a material suitable for a heat spreading layer 122 is a graphite-epoxy composite. The in-plane thermal conductivity of a graphite-epoxy composite material is approximately 370 watts per meter per Kelvin, while the out of plane thermal conductivity of the same material is 6.5 watts per meter per Kelvin. The thermal anisotropy of the graphite/epoxy composite material is then 57, meaning that heat is conducted 57 times more readily in the plane of the material than through the thickness of the material. This thermal anisotropy allows the heat to be readily spread out from the surface which in turn allows for more heat to be drawn out of the resistive elements 208.

The heat spreading element 122 may comprise a material that is thermally isotropic in one plane. The thermally isotropic material may distribute the heat energy more evenly and more efficiently. One such material suitable for forming the heat spreading element 122 is GRAFOIL® available from Graftech Inc. located in Lakewood, Ohio. In particular, GRAFOIL® is a flexible graphite sheet material made by taking particulate graphite flake and processing it through an intercalculation process using mineral acids. The flake is heated to volatilize the acids and expand the flake to many times its original size. The result is a sheet material that typically exceeds 98% carbon by weight. The sheets are flexible, lightweight, compressible resilient, chemically inert, fire safe, and stable under load and temperature. The sheet material typically includes one or more laminate sheets that provide structural integrity for the graphite sheet.

Due to its crystalline structure, GRAFOIL® is significantly more thermally conductive in the plane of the sheet than through the plane of the sheet. This superior thermal conductivity in the plane of the sheet allows temperatures to quickly reach equilibrium across the breadth of the sheet.

Typically, the GRAFOIL® will have no binder, resulting in a very low density, making the heated cover relatively light while maintaining the desired thermal conductivity properties. For example, the standard density of GRAFOIL® is about 1.12 g/ml.

Another product produced by GrafTech Inc. that is suitable for use as a heat spreading element 122 is eGraf® SpreaderShield™. The thermal conductivity of the SpreaderShield™ products ranges from 260 to 500 watts per meter per Kelvin within the plane of the material, and that the out of plane (through thickness) thermal conductivity ranges from 6.2 down to 2.7 watts per meter per Kelvin. The thermal anisotropy of the material ranges from 42 to 163. Consequently, a thermally anisotropic planar heat spreading element 122 serves as a conduit for the heat within the plane of the heat spreading element 122, and quickly distributes the heat more evenly over a greater surface area than a foil. The efficient planar heat spreading ability of the planar heat spreading element 122 also provides for a higher electrical efficiency. In some embodiments, the heat spreading element 122 is a planar thermal conductor. In certain embodiments, the graphite may be between 1 thousandths of an inch thick and 40 thousandths of an inch thick. This range may be used because within this thickness range the graphite remains pliable and durable enough to withstand repeated rolling and unrolling as the heating unit 100 is unrolled for use and rolled up for storage.

The heat spreading element 122 may comprise a flexible thermal conductor. In certain embodiments, the heat spreading element 122 is formed in strips along the length of the heat generating element 114. In alternative embodiments, the heat spreading element 122 may comprise a contiguous layer.

In some embodiments, the heat spreading element 122 may also include functionality for conducting electrical energy and converting electric energy to thermal energy in a substantially consistent manner throughout the heat spreading element. Graphite heat spreading elements may be particularly well suited for these embodiments. In such an embodiment, a heat generating element 114 may be omitted from the heating unit 100 as the heat spreading element 122 serves the purposes of conveying current, producing heat due to resistance, and evenly distributing the heat.

The small size and thickness of the graphite minimizes the weight of the heat spreading element 122. The graphite containing heat spreading element may be pliable such that the graphite can be rolled lengthwise without breaking the electrical path through the graphite.

In some embodiments, the heat spreading element 122 may include a heat conducting liquid such as water, oil, grease, etc.

In certain embodiments, the heat generating element 114 is in direct contact with the heat spreading element 122 to ensure efficient thermo-coupling. Alternatively, the heat spreading element 122 and the heat generating element 114 are integrally formed. For example, the heat spreading element 122 may be formed or molded around the heat generating element 114. Alternatively, heat generating element 114 and the heat spreading element 122 may be adhesively coupled.

Notably, while temperature may be controlled with the use of thermostats as described above, other embodiments may implement other design criteria to control temperature. For example, some embodiments may use appropriate selection of the heat spreading element 122 and/or the arrangement of the heat generating element 114. Illustratively, the heat retention properties of the heat spreading element 122 may be a factor in regulating temperatures at which a heating unit 100 will operate. Further, the density of the heat generating element 114 with respect to the size of the heating unit 100 or the heat spreading element 122 can be used set the operating temperatures or to regulate temperatures.

Figure 4A:
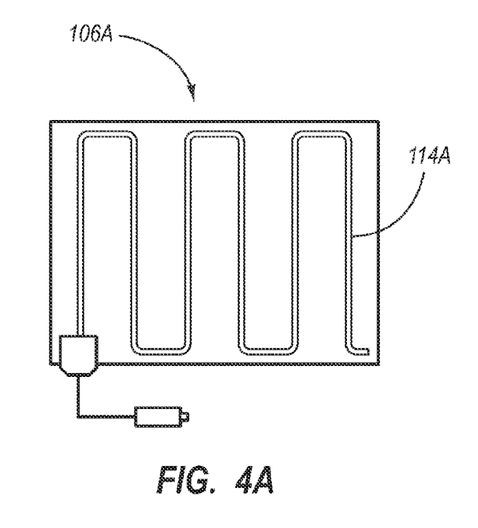
FIGS. 4A and 4B illustrates comparative alternate heat generating element arrangements for the heating apparatus.
Figure 4B:
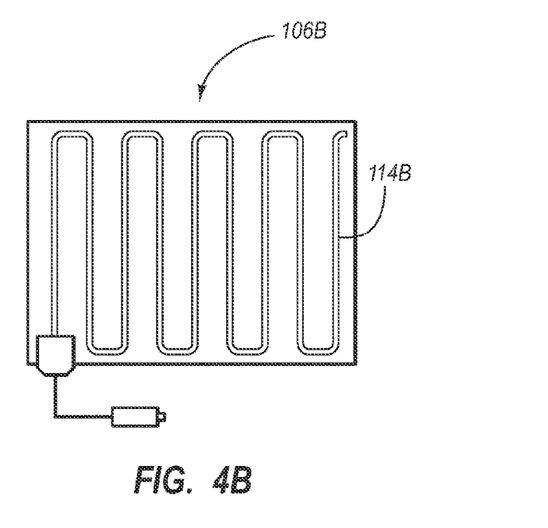

Controlling the density of the heat generating element 114 may be accomplished by controlling spacing between different portions of the heat generating element allowing for more or less material used for the heat generating element 114 to be included in the heating unit 100. This method may be especially useful when heat generating elements have a constant Wattage output per length of heat generating element. Thus a longer heat generating element 114 provides more heat than a shorter heat generating element 114. FIGS. 4A and 4B illustrate a comparative example where two alternative embodiments are illustrated. Each of the embodiments illustrates a heating unit 100 of the same size, but with different heat generating elements densities. The first embodiment illustrates a heating element 106A with a less dense heat generating element 114A, while the second embodiment illustrates a heating element 106B with a more dense heat generating element 114B. The first embodiment with the less dense heat generating element 114A will operate at a lower temperature than the second embodiment with the more dense heat generating element 114B.

Notably, the temperature may also be controlled by selection of the heat generating element 114 properties. For example, while the example above illustrates a heat generating element 114 that produces 9 Watts per linear foot, other heat generating elements may produce more heat if higher temperatures are desired or less heat if lower temperatures are desired.

In some embodiments, a 24 by 24 inch heating unit 100 may include a heat generating element 114 that is about 10 feet in length and supplies about 9 Watts per foot. When operated at 12 Volts DC, this example, generates about 90 Watts of heat and draws about 7.5 Amperes. Other embodiments may be 18 by 24 inches, or other appropriate sizes.

Returning once again to FIG. 1, FIG. 1 illustrates an optional insulating layer 104. The insulating layer 104 may be used to reflect or direct heat or to prevent heat from exiting in an undesired direction. For example, it may be desirable to have all or most of the generated heat be directed towards a particular surface of the heating unit 100. In the example illustrated, it may be desirable to have heat directed towards the side of the heating unit 100 which includes the second cover layer, while directing heat away from the side that includes the first cover layer. The insulating layer 104 may be used to accomplish this task.

The insulating layer 104 may includes a sheet of polystyrene, cotton batting, Gore-Tex®, fiberglass, foam rubber, closed cell foam, etc. In certain embodiments, the insulating layer 104 may allow a portion of the heat generated by the heat generating element 114 to escape the top of the second cover layer 108 to prevent ice and snow accumulation. For example, the insulating layer 104 may include a plurality of vents to transfer heat to the second cover layer 108. In certain embodiments, the insulating layer 104 may be integrated with either the first cover layer 102 or the second cover layer 108. For example, the first cover layer 102 may include an insulation fill or batting positioned between two films of nylon or vinyl.

FIGS. 1 and 2 further illustrate first and second cover layers 102 and 108. In some embodiments, first and second cover layers 102 and 108 may comprise a textile fabric. The textile fabric may include natural or synthetic products. For example, the first and second cover layers 102 and 108 may comprise burlap, canvas, cotton or other materials. In another example, first and second cover layers 102 and 108 may comprise nylon, vinyl, or other synthetic textile material. The first and second cover layers 102 and 108 may comprise a thin sheet of plastic, metal foil, polystyrene, or other materials.

In manufacturing the heating unit 100, the heating element 106 and insulation layer 104 may be sealed between the first and second cover layers 102 and 108. As illustrated in FIGS. 1 and 2, the first and second cover layers 102 and 108 extend slightly beyond the heating element 106 and insulation layer 104. This allows the first and second cover layers 102 and 108 to be sealed, such as be using an adhesive, heat welding, or another other appropriate method or combination of methods.

Additionally, the heating unit 100 may be constructed such that the first and second cover layers 102 and 108 may include one or more fasteners 124 for hanging, securing, or connecting the heating unit 100. In some embodiments, the fasteners 124 may be attached or formed into the corners of the heating unit 100. Additionally, fasteners 124 may be distributed about the perimeter of the heating unit 100. In some embodiments, the fastener 124 is a hook and loop fastener such as Velcro®. For example, the heating unit 100 may include a hook fabric on one side and a loop fabric on an opposite side. In other embodiments a two sided strap with one side including a hook fabric and the other side including a loop fabric may be connected to one side of the heating unit and may pass through an opening on a different side of the heating unit to secure the heating unit. In other alternative embodiments, the fastener 206 may include grommets, snaps, zippers, adhesives, or other fasteners. Further, additional objects may be used with the fasteners to accomplish fastening. For example, when grommets are used, elastic cord, such as bungee cord may be used to connect to grommets on opposite sides of the heating unit 100. This may be used, for example to wrap the heating unit around objects, such as barrels or buckets.

In certain additional embodiments, the thermal heating unit 100 may include one or more creases to facilitate folding the thermal heating unit 100. The creases may be oriented across the width or length of the thermal heating unit 100. In some embodiments, a crease may be formed by heat welding a first cover layer 102 to a second cover layer 108. In some embodiments, the thermal heating unit 100 comprises pliable material, however the creases 220 may facilitate folding a plurality of layers of the thermal heating unit 100.

In some embodiments, the first cover layer 102 may be positioned at the top of the heating unit 100 and the second cover layer 108 may be positioned on the bottom of the heating unit 100. In certain embodiments, the first cover layer 102 and the second cover layer 108 may comprise the same or similar material. Alternatively, the first cover layer 102 and the second cover layer 108 may comprise different materials, each material possessing properties beneficial to the specified surface environment.

For example, the first cover layer 102 may comprise a material that is resistant to sun rot such as such as polyester, plastic, and the like. The second cover layer 108 may comprise material that is resistant to mildew, mold, and water rot such as nylon. The outer layers 102 and 108 may comprise a highly durable material. The material may be textile or sheet, and natural or synthetic. For example, the outer layers 102, 108 may comprise a nylon textile. Additionally, the outer layers 102, 108 may be coated with a water resistant or waterproofing coating. For example, a polyurethane coating may be applied to the outer surfaces of the outer layers 102, 108. Additionally, the top and bottom outer layers 102, 108 may be colored, or coated with a colored coating such as paint. In some embodiments, the color may be selected based on heat reflective or heat absorptive properties. For example, the top layer 102 may be colored black for maximum solar heat absorption. The bottom layer 102 may be colored grey for a high heat transfer rate or to maximize heat retention beneath the cover.

The embodiment shown in FIGS. 1 and 2 includes a 7 foot power cord connected to the heat generating element 114. Other cord lengths may also be implemented within the scope of embodiments of the invention. The power cord may additionally be connected to an incoming direct current electrical connection 110 such as a bare wire connector, alligator clip connectors, a cigarette lighter plug connector, trailer hitch connector or other appropriate connector for connecting the power cord to a direct current source of power, such as an automobile power source. Notably, modern wiring for trailer hitch wiring includes a six or seven pin connector which includes a power and ground terminal. Thus, some embodiments may include a six or seven pin mating connector to connect to the connector at the trailer hitch. Only the power and ground connectors of the mating connector need to be connected to the heat generating element 114. This allows, for example, for a heating unit to be used for heating items in the back of a truck bed.

Note that embodiments can be wired directly to the 12 volt source and turned on and off with a switch, can be hooked up to turn on and off with the start of the key, or can be simply connected in an always on so long as connected to power configurations. Additionally, some embodiments may include timing circuitry such that the heating unit 100 turns on or off for predetermined intervals, after the expiration of a predetermined time, etc.

Notably, some embodiments may be implemented with interchangeable incoming direct current electrical connections. For example, the embodiment illustrated in FIG. 1 includes a kit which includes a heating unit 100 with a two pin auto connector 142. The kit may further include a wire 144 without an additional connector connected to a mating two pin auto connector 146, a set of alligator clips 148 connected to a mating two pin auto connector 150, and a cigarette lighter plug 110 connected to a mating two pin auto connector 152. A user can then select an appropriate incoming direct current electrical connection 110. For example, a user may select the wire 144 without additional connector if the heating unit 100 is to be hard wired to an electrical system, such as an automobile, boat, or other electrical system. Cigarette lighter plugs 110 or alligator clip 148 connections could be selected for more temporary connections.

Additionally, some embodiments may include an outgoing direct current electrical connection 112. This may be used, for example to allow chaining of heating units together. In the example illustrated, the outgoing direct current electrical connection 112 is connected electrically to the incoming direct current electrical connection through conductors 126 passing through the heating unit 100. Other embodiments may allow the incoming electrical connection 110 and outgoing electrical connection 112 to be more or less proximate to each other as appropriate. Note that many embodiments do not include outgoing direct current electrical connections due to the high amperage that may pass through conductors when multiple units are chained together. As noted above, high current may be controlled through various current control devices such as circuit breakers and current limiting elements.

While not illustrated in the Figures, some embodiments may include, in addition to the DC connections illustrated above, an AC plug. The AC plug may be connected to an additional heat generating element that is configured to operate at the higher voltages typically found in AC circuit, such as 120 or 240 V circuits. To maintain consistency of heating, the heat generating element may nonetheless be configured to output a similar wattage of heat per lineal measurement as the heat generating element 114. For example, the heat generating element connected to the AC plug may be configured to deliver 9 Watts per linear foot. Some embodiments may further include an AC receptacle to allow for daisy chaining of heating units where the electrical conductors of the AC receptacle are electrically connected to electrical conductors of the AC plug.

Notably, embodiments that include both a DC plug and an AC plug may further include various switches configured to select which power source will be in use at a given time. Such switches may be, for example, manual toggle switches. Alternatively or additionally, such switches may be mechanical or solid state switches or relays which include functionality for detecting current being applied to the AC or DC plug and selecting an appropriate heat generating element based on the detection.

As noted, when diesel or propane goes below certain temperatures, it turns into gel or will liquefy (in the case of propane) so being able to heat it while driving can be performed by 12 Volt heating. Other uses, in additional to those noted above, include heating animals while transporting them and an emergency 12 Volt blanket for use in an automobile.

Other embodiments may include using the heating unit as a removably mounted ice or frost removal device for automobile windshields or windows. One such embodiment may further include timing circuitry such that a user can select when window defrosting should occur. For example, a user may drive to work in an automobile. When the user arrives at work, the user may place the heating unit 100 near an automobile window and plug the heating unit 100 into a cigarette lighter receptacle in the automobile. The user may then specify on a timer that the heating unit should begin to supply heat in eight hours. After the user finishes the work day, the windshield of the automobile will be defrosted, without having to have the heating unit 100 supplying heat the entire day. Similarly, the timer may have a setting based on time of day, expired period of time, etc. For example, a user may specify that the heating unit begins supplying heat at 7:55 A.M. if the user intends to leave for work at 8:00 A.M. The timer may be an electronic controlled device supplied by the direct current electrical connection 112 and may include internal switching such as relays, solid state switches, or other switching for supplying power to the heat generating element 114. Further, the heating unit may include sensing circuitry to prevent the heating unit from depleting an automobile battery such that the automobile cannot be later started. Further, in some embodiments, the timer may be configured to allow the heating unit to only operate for a short period of time so as to avoid depleting the automobile battery should a user be delayed.

Still other embodiments may be utilized in boating applications, such as for a boat seat warmer. Applications may be implemented where embodiments are used for hunting or other recreational activities. A heated seat may be implemented by using a portable battery power source with the heating unit 100. Embodiments may also be implemented in recreational vehicle applications, such as by providing a heated blanket. Applications may be directed to use in emergency kits for remote treatment of hyperthermia, frostbite, or other temperature related ailments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A heating unit for use in direct current applications, the heating unit comprising:

a first pliable outer layer;

a second pliable outer layer;

a pliable electrical heating element disposed between the first pliable outer layer and the second pliable outer layer and configured to convert electrical energy to heat energy and to distribute the heat energy, the pliable electrical heating element comprising:

a heat generating element for converting electrical current to heat energy; and a planar heat spreading element comprising graphite thermally coupled to the heat generating element, the planar heat spreading element being configured to draw the heat energy out of the heat generating element and substantially evenly distribute the heat energy over a substantial surface area of the second pliable outer layer;

a thermal insulation layer positioned above the pliable electrical heating element and between the first pliable outer layer and the second pliable outer layer such that the thermal insulation layer directs the heat energy towards the second pliable outer layer and away from the first pliable outer layer; and a receiving power connector electrically connected to the heat generating element, the receiving power connector being configured to couple to a direct current power source.

2. The heating unit of claim 1, wherein the receiving power connector is configured to connect to an automotive power source.

3. The heating unit of claim 2, wherein the receiving power connector comprises a cigarette lighter connector or automotive power connector.

4. The heating unit of claim 2, wherein the receiving power connector comprises alligator clips configured to connect to an automotive battery.

5. The heating unit of claim 2, wherein the receiving power connector comprises a mating trailer hitch connector configured to connect to a trailer hitch connector.

6. The heating unit of claim 2, wherein the heating unit is configured to be mounted on fuel tanks to prevent gelling of gas, diesel, or propane fuel disposed in the fuel tanks.

7. The heating unit of claim 2, wherein the heating unit is configured to be mounted in automobile floor boards to provide heat to the automobile interior, including when the automobile is not running.

8. The heating unit of claim 2, wherein the heating unit is configured to be removably mounted on an automobile dashboard to prevent build-up of frost or ice on an automobile windshield.

9. The heating unit of claim 2, wherein the heating unit is configured to be removably mounted near an automobile window to prevent build-up of frost or ice on the automobile window.

10. The heating unit of claim 2, wherein the heating unit is configured to be mounted in an automobile for providing heat to people or animals being transported in the automobile.

11. The heating unit of claim 1, wherein the heating unit comprises a thermostat configured to regulate an operating temperature of the heating unit.

12. The heating unit of claim 11, wherein the thermostat comprises a thermostat with a fixed temperature rating.

13. The heating unit of claim 11, wherein the thermostat comprises a thermostat with a user selectable temperature rating.

14. The heating unit of claim 1, wherein the heating unit comprises a timer configured to control when the heating unit supplies heat energy.

15. A kit for allowing for selectable connection of an incoming direct current electrical connection, the kit comprising:

a heating unit, the heating unit comprising:
  a first pliable outer layer;
  a second pliable outer layer;
  a pliable electrical heating element disposed between the first pliable outer layer and the second pliable outer layer and configured to convert electrical energy to heat energy and to distribute the heat energy, the pliable electrical heating element comprising:
    a heat generating element for converting electrical current to heat energy; and
    a planar heat spreading element comprising graphite thermally coupled to the heat generating element, the planar heat spreading element being configured to draw the heat energy out of the heat generating element and substantially evenly distribute the heat energy over a substantial surface area of one of the first pliable outer layer and the second pliable outer layer;
  a thermal insulation layer positioned above the pliable electrical heating element and between the first pliable outer and the second pliable outer layer; and
  a receiving power connector electrically connected to the heat generating element, the receiving power connector comprising a coupling for selectively connecting a mating incoming power coupling to the heating unit; and
a plurality of selectively interchangeable power connectors that can be selectively and interchangeably connected to the receiving power connector to facilitate electrical connection between the receiving power connector and a variety of different types of power source connections, the plurality of selectively interchangeable power connectors comprising:
  a first incoming power connector, the first incoming power connector comprising a first coupling for selectively mating to the receiving power connector coupling and wires configured to be hard wired to a direct current power source;
  a second incoming power connector, the second incoming power connector comprising a second coupling for selectively mating to the receiving power connector coupling and alligator clips configured to be selectively wired to a direct current power source; and
  a third incoming power connector, the third incoming power connector comprising a third coupling for selectively mating to the receiving power connector coupling and a cigarette lighter plug configured to be selectively wired to a direct current power source.

* * * * *